Oct. 15, 1968 O. J. ALBRECHT 3,405,857

COMBINED READER-REELER WITH VARIABLE TENSION WEB CONTROL

Filed May 18, 1966

Inventor
Otto J. Albrecht
By James J. Jennings, Jr.
Attorney

United States Patent Office 3,405,857

Patented Oct. 15, 1968

3,405,857

COMBINED READER-REELER WITH VARIABLE TENSION WEB CONTROL

Otto J. Albrecht, Trenton, N.J., assignor to Borg-Warner Corporation, Chicago, Ill., a corporation of Illinois Filed May 18, 1966, Ser. No. 551,140

6 Claims. (Cl. 226—195)

ABSTRACT OF THE DISCLOSURE

In a reader-reeler a buffer arm has one end engaging the material strand and its other end coupled to a pivot shaft. A pair of tension regulating springs have their body portions encircling the pivot shaft to apply tension forces at two different levels over the buffer arm to the strand as the buffer arm is moved through two different arcuate zones of movement.

The present invention is directed to a reader-reeler combination, that is, a system for displacing a tape or web on which information is represented combined with a system for "reading" or removing the information from the tape, and more particularly to such a system in which buffer arms are employed both to accommodate variations in tension and slack which appear in the web and also to apply regulated tension at various levels to the web in relation to various positions of the buffer arms.

When a "tape" on which information is represented by holes, dots, chads or other means is passed from a supply reel through an optical reading station to a take-up reel, large differences in the velocities of the tape at different points occur during system start-up, stopping, and during stepping or asynchronous operation of the system. Such acceleration and deceleration effects tension variations in the web which must be accommodated both to avoid tape breakage and to ensure the tape is not minutely displaced to occasion an error in the reading operation. It has been general practice (in reelers or spoolers) to provide a slack take-up means, frequently termed a dancer arm, adjacent each of the supply and take-up reels and to bias the dancer arm for movement such that as slack occurs in the system, the tension imposed by the spring connected to the dancer arm urges the dancer arm to take up the slack and thus apply tension, of a level related to the physical constants of the dancer arm spring, to the tape. However this conventional arrangement has not proved suitable for accommodating all the tension variations which may occur, particularly when both a reader and a reeler are combined in a unitary system.

It is therefore a salient object of the present invention to provide a single system which combines both the reading components and the reeling or spooling components heretofore conventionally packaged into separate units.

It is another important object of the present invention to provide a novel buffer arm arrangement for applying tension at different levels to the tape or web during system operation, which tension level is a function of the buffer arm position.

In a preferred embodiment a system incorporating the principles of this invention for regulating the level of tension applied to a web includes a buffer arm, having first and second end portions, supported for displacement through first and second zones of movement. The first end portion of the buffer arm engages the web. A first tension regulating means, which may be a spring, is operative to apply tension at a first level over the buffer arm to the web through a first zone of the buffer arm movement. A second tension regulating means is also provided, to apply tension at a second level over the buffer arm to the web through a second zone of buffer arm movement.

With this system, tension at a first level is applied to the web as the buffer arm moves through the first zone, and tension of at least the second level is applied to the web as the buffer arm moves through the second zone. Thus the tension level applied to the web is a function of buffer arm position.

Now in order to acquaint those skilled in the art with the best mode contemplated for making and using the invention, a description thereof will be set forth in connection with the accompanying drawing, in the several figures of which like reference numerals identify like elements, and in which.

*General system arrangement*

Figure 1:
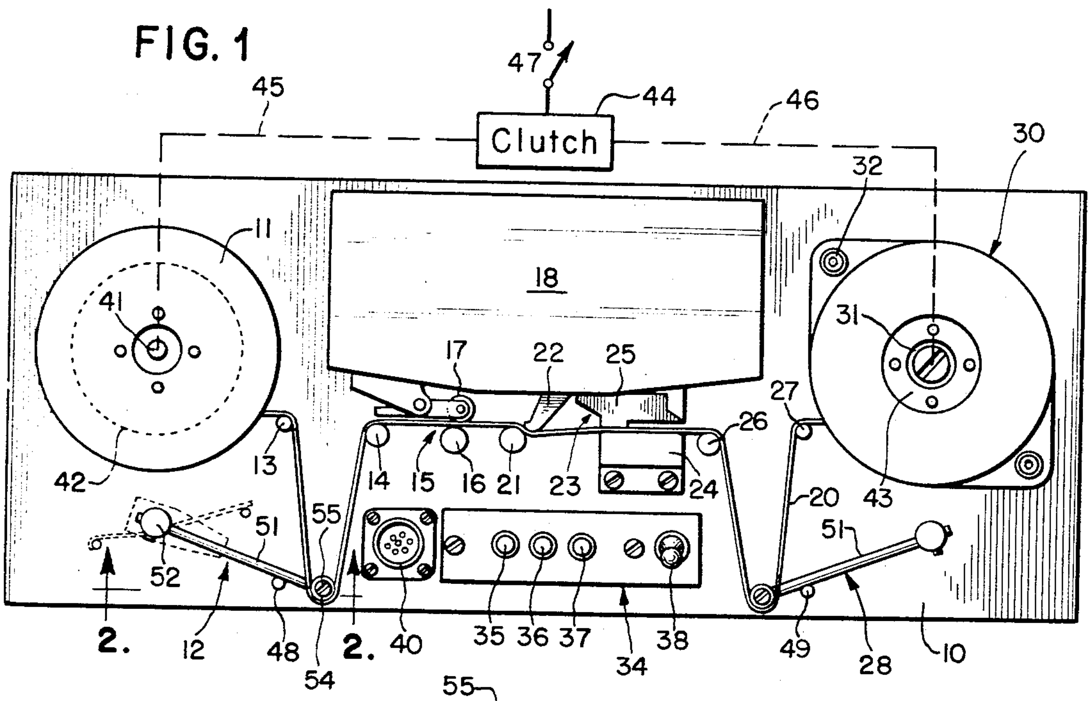
FIGURE 1 is a front view of a novel reader-reeler combination constructed in accordance with the inventive principles.

In FIGURE 1 the front panel 10 of a reader-reeler incorporating the present invention is illustrated. Major components visible on the front panel include a take-up reel 11, a combined slack-sensor-and-tension-regulator assembly 12, which appears similar to a conventional dancer arm in this view, a stop 48 for the arm 51 of assembly 12, tape guides 13 and 14, a drive assembly 15 including a continuously-driven (when the system is energized) capstan roller 16 and a pinch roller 17, a protective hood 18 for shielding the optical system which illuminates the web 20 as it passes over adjustable tape guide 21 and under the read head assembly 22, a brake assembly 23 including a lower fixed portion 24 and an upper or shoe portion 25, another pair of tape or web guides 26 and 27, and another tension regulator assembly 28, the arm of which is abutting a stop member 49. At the right end of panel 10 a cartridge assembly 30 is affixed, being inserted over indexing hub 31 and secured by a pair of fastening nuts 32.

At the lower central portion of the front panel is a control strip 34 including a power switch actuator button 35, a load-ready switch 36, a rewind button 37, and a strip-cant switch 38. An electrical connector 40 is affixed to front panel 10 adjacent control strip 34.

The general arrangement and operation of readers are now well known, but it is not conventional to have both the reading equipment (such as that illustrated in the central portion of front panel 10 between tape guides 14 and 26) combined with the spooler or reeler equipment, including the take-up reel 11, the cartridge assembly 30 which includes supply reel 43, and the tension regulators 12 and 28, in a unitary apparatus. Take-up reel 11 is inserted on indexing shaft 41, the rear portion of which is driven by a motor 42 to pull the web 20 from reel 43 past the scanning system onto the take-up reel 11. A clutch 44 is provided and mechanically interconnected, in a manner well known and represented by the broken lines 45, 46, to disengage motor 42 from driving shaft 41 and pass the mechanical drive from the motor to impart angular displacement to shaft 31 and thereby drive reel 43 during the rewind mode of equipment operation. This operation can be regulated by closure of electrical switch 47, which may be immediately behind and actuated by rewind button 37 on the control strip. Clutch 44, like motor 42, is actually mounted behind front panel 10 to provide a unitary, efficient combination of a reader and a reeler in a single piece of equipment.

*Tension Regulators*

Figure 2:
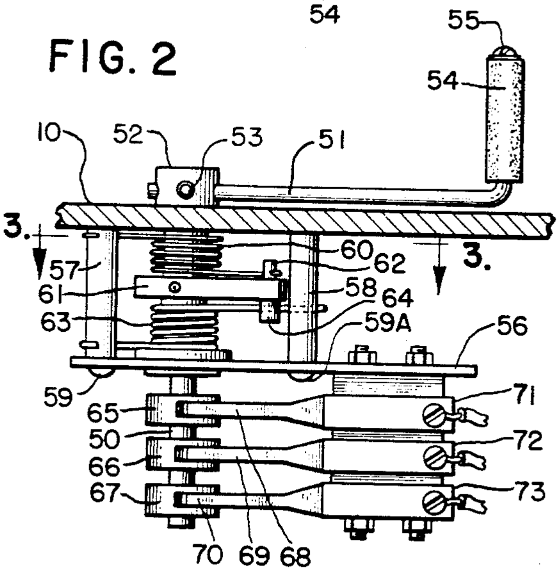
FIGURE 2 is a sectional view, taken generally along the line 2—2 in FIGURE 1 and on a scale enlarged with respect thereto, depicting significant portions of a tension-regulating assembly.

Important to the present invention is the provision of a plurality of tensioning means which are positioned to be effective over different portions of the arcuate movement of the assemblies 12 and 28. As shown in FIGURE 2, the slack-sensing-and-tension-applying assembly 12 includes a pivot shaft 50 which extends through an aperture in panel 10 and a similar aperture in support board 56. On the front side (upper portion as shown in FIGURE 2) is an arm 51, and one end of this arm is received in a collar 52 which is secured to shaft 50 by a set screw 53. The other end of arm 51 includes a portion perpendicular to the longer portion, on which a web roller 54 is positioned and secured in place by a screw 55 affixed to the extremity of arm 51. It is thus manifest that, considering the position of arm 51 in FIGURE 1, as arm 51 is displaced about shaft 50 there is a corresponding rotation of shaft 50 in its mounting apertures in front panel 10 and in support board 56, which is spaced from panel 10 by a pair of support shafts 57, 58. Small screws 59, 59A are utilized to maintain the support shafts in the illustrated positions, and additional shafts may be utilized to provide the requisite mechanical strength and security.

Particularly in accordance with the present invention, a plurality of different tension regulating means are provided on shaft 50 to effect the application of different tension levels over arm 51 of assembly 28 as a function of the different angular locations of arm 51 in system operation. First tension regulating means 60 is a first tension spring, the several turns of which are wound about shaft 50 between panel 10 and an arm member 61. One end of arm 61 has an aperture through which shaft 50 passes, and a set screw affixes that end of arm 61 to shaft 50 so that, like arm 51, arm 61 rotates in accordance with the rotation of shaft 50. One end of spring 60 extends outwardly from shaft 50 and is wrapped around support post 57. The other end of spring 60 extends adjacent arm 61 and is affixed to the portion of arm 61 remote from shaft 50 by a pin 62. This spring 60, in the preferred embodiment, is a low tension spring having a low spring rate and a low spring force.

The second tension regulating means 63 is a high tension spring having a high spring force and a higher spring rate than that of spring 60. Spring 63 also has a central portion wrapped around about shaft 50, and one end portion of this spring also extends outwardly and is wrapped around support post 57. The other end portion of spring 63 extends adjacent arm 61, and is restrained by, but not wrapped around, post 58. A stop arrangement or pin 64 is secured to the outer end of arm 61 on the side of this arm nearer board 56 in a position to engage spring 63 during a portion of the rotation of arm 61, as will be explained hereinafter in connection with FIGURES 3A and 3B.

Three separate switch-operating components 65, 66, 67 are positioned on the rear of shaft 50 as shown. These components may be conventional cams for engaging switch actuators 68, 69 and 70 at given predetermined angular positions of pivot shaft 50, thus to effect closure of the respective switch (not shown) within switch assemblies 71, 72 and 73 to energize associated equipment in accordance with the angular position of buffer arm 51. Such construction and operation is well known and understood in the mechanical control art.

Figure 3A:
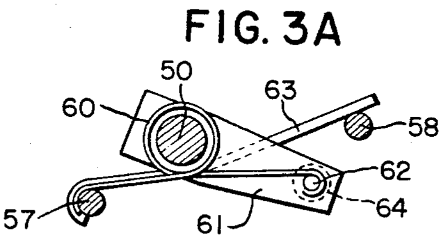
FIGURES 3A and 3B are sectional views, taken along line 3—3 in FIGURE 2, useful in explaining the operation of the invention.
Figure 3B:
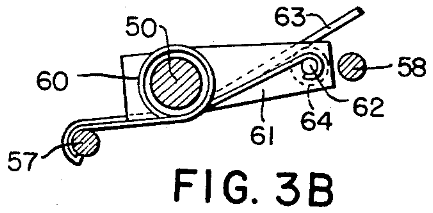
Figure 4:
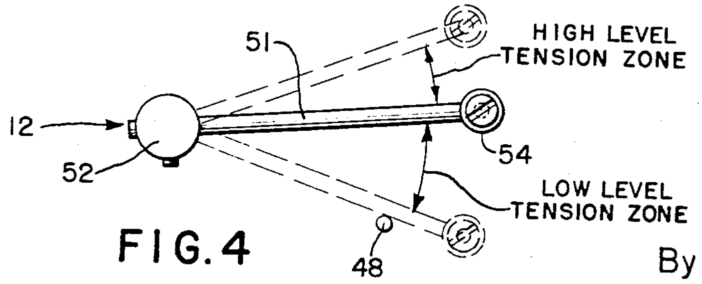
FIGURE 4 is an illustrative showing, similar to a portion of FIGURE 1 but on an enlarged scale with respect thereto, useful in explaining this invention.

Considering the illustrative showing in FIGURE 4 together with the components shown in FIGURES 3A and 3B, as buffer arm 51 moves from a first position abutting stop 48 to an intermediate position depicted by the solid lines in FIGURE 4, a low level of tension is applied over the buffer arm to the web by spring 60. This occurs by reason of one end of spring 60 being anchored to post 57, and the other end of the spring being connected to the outer end of arm 61. Thus the tension level throughout the low level tension zone is determined by the physical constants of spring 60. From FIGURE 3A it is evident that spring 63 is restrained by post 58 from engagement with stop member 64 as the buffer arm moves through the low level tension zone.

As buffer arm 51 is displaced from the solid line position in FIGURE 4 in the counterclockwise direction through the high level tension zone, stop 64 on arm 61 engages the outer portion of spring 63 and the additional tension provided by spring 63 is applied over arm 51 to the web. Thus the level of tension applied through this zone is at least equal to the tension of spring 63, but it is apparent that spring 60 is still effective through the high level tension zone and thus the actual tension applied is a composite of both spring tensions. As a practical matter the spring 63 is made much stronger than spring 60 and thus for understanding the over-all operation it can be said that the tension applied to the web as arm 51 is displaced through the high level tension zone is a function of spring 63.

For illustrative purposes only and in no sense by way of limitation, in a preferred embodiment the low tension spring 60 was comprised of stainless steel (federal composition F.S.–302), having 5¾ turns with an inside coil diameter of 9⁄16 inch and a wire diameter of 0.035 inch. Spring 63 was also comprised of stainless steel wire (federal composition F.S.–302), and likewise had an inside coil diameter of 9⁄16 inch. Spring 63 had 4⅞ turns, and a wire diameter of 0.065 inch. With these specific spring arrangements the first or low level tension spring 60 had a spring rate of approximately one-tenth of an inch-ounce of torque per degree of rotation by the arm 61, and a spring force of 6 to 8 inch-ounces. The second or high level tension spring 63 has a spring rate of approximately eight-tenths of an inch-ounce of torque per degree of rotation by the arm 61, and a spring force of 64 to 80 inch-ounces. With these constants, the level of tension applied to the web will vary from 1–2 ounces in the first or low zone of the buffer arm movement, and from 12–16 ounces in the second or high zone of the buffer arm movement. It is manifest that by selecting different first or second springs, the tension within any zone can be made to be substantially constant within that zone, or can be made to vary over a wider range than shown in the preferred embodiment.

*Summary*

The present invention finds utility in any strand or web-handling apparatus. When a unitary, compact reader-reeler system is provided, the modulation of tension applied to the web as a function of buffer arm position appears to be of significant advantage in accommodating the large tension variations which occur during start-up, acceleration and deceleration, and stopping of the system. A straightforward amalgamation of the reeler components into a reader system does not provide the efficiency and accurate operation achieved with the unobvious combination of the present invention.

While only a particular embodiment of the present invention has been disclosed and claimed herein, it is apparent that various modifications and alterations may be made therein. It is therefore the intention in the appended claims to cover all such modifications and alterations as may fall within the true spirit and scope of the invention.

What is claimed is:

1. In a system for regulating the level of tension applied to a strand of material, a buffer arm supported for displacement through first and second zones of movement and having first and second end portions, said first end portion of the buffer arm engaging the strand, a pivot shaft, coupled to one end of said buffer arm, a first tension regulating spring, having a body portion encircling said pivot shaft and a pair of end portions, operative to apply tension at a first level over the buffer arm to said strand through the first zone of buffer arm movement, and a second tension regulating spring, having a body portion encircling said pivot shaft and a pair of end portions, operative to apply tension at a second level over the buffer arm to said strand through the second zone of buffer arm movement, whereby tension at said first level is applied to the strand as the buffer arm moves through said first zone and tension of at least said second level is applied to the strand as the buffer arm moves through said second zone.

2. A system as claimed in claim 1 and further comprising an arm member having a first end portion affixed to said pivot shaft and a second end portion, one end portion of one of said tension springs being secured to the second end portion of said arm member, thus to establish the first level of tension as the buffer arm moves through said first zone, and a stop member affixed to said second end portion of the arm member for engagement by an end portion of the other of said tension springs as the buffer arm moves through said second zone.

3. A system as claimed in claim 2 and further comprising at least one switch-operating component disposed on said pivot shaft for switch actuation at a given predetermined angular position of the pivot shaft, thus to energize associated equipment in accordance with the angular position of said buffer arm.

4. In a system for regulating tension in a web passing between first and second points, a web tension regulator comprising a buffer arm having first and second end portions, the first end portion of said buffer arm contacting said web between said first and second points, means including a pivot shaft coupled to one end of said buffer arm for supporting said buffer arm for angular displacement about its second end portion, a first tension regulating spring, having a body portion wound around said pivot shaft and a pair of end portions, positioned to regulate the tension applied over said buffer arm to the web as said first end portion is displaced through a first zone of said angular displacement, and a second tension regulating spring, having a body portion wound around said pivot shaft and a pair of end portions, positioned to regulate the tension applied over said buffer arm to said web means as said first end portion is displaced through a second zone of said angular displacement, whereby different levels of tension are applied over the buffer arm to said web between the first and second points as a function of the buffer arm position during system operation.

5. A system as claimed in claim 4 and further comprising an arm member having a first end portion affixed to said pivot shaft and a second end portion, one end portion of one of said tension springs being secured to the second end portion of said arm member, thus to establish the first level of tension as the buffer arm moves through said first zone, and a stop member affixed to said second end portion of the arm member for engagement by an end portion of the other of said tension springs as the buffer arm moves through said second zone.

6. A system as claimed in claim 5 and further comprising at least one cam mounted on said pivot shaft for switch actuation at a given predetermined angular position of the pivot shaft, to energize associated equipment in accordance with the angular position of said buffer arm.

References Cited

UNITED STATES PATENTS

| | | | |
|---|---|---|---|
| 3,022,960 | 2/1962 | Foster | 242—75.3 |
| 3,092,295 | 6/1963 | Giannuzzi | 226—11 X |
| 3,118,629 | 1/1964 | Chitty | 242—75.3 X |
| 3,190,575 | 6/1965 | Hayner et al. | 242—55.13 |
| 3,191,881 | 6/1965 | Campbell et al. | 242—71.1 X |

GEORGE F. MAUTZ, *Primary Examiner.*